United States Patent [19]

Nakazaki et al.

[11] B 3,999,030
[45] Dec. 21, 1976

[54] WELDING METHOD FOR DISSIMILAR METALS

[75] Inventors: Takamitsu Nakazaki, Takahagi; Hisanao Kita, Hitachi; Tatsuo Yonezawa, Hitachi; Hisanori Okamura, Hitachi, all of Japan

[73] Assignee: Hitachi, Ltd., Japan

[22] Filed: June 14, 1974

[21] Appl. No.: 479,502

[44] Published under the second Trial Voluntary Protest Program on March 16, 1976 as document No. B 479,502.

[30] Foreign Application Priority Data

June 18, 1973  Japan .............................. 48-67776

[52] U.S. Cl. .......................... 219/121 EM; 219/118
[51] Int. Cl.² ........................................ B23K 15/00
[58] Field of Search ............. 219/121 EB, 121 EM, 219/121 LM, 121 R, 118, 69, 137; 250/493

[56] References Cited

UNITED STATES PATENTS

| | | | |
|---|---|---|---|
| 3,436,515 | 4/1969 | Sayer et al. | 219/121 EM |
| 3,560,700 | 7/1971 | Reidelsturz et al. | 219/121 EM |
| 3,582,605 | 6/1971 | Lamatsch | 219/121 EM |
| 3,808,395 | 4/1974 | Bailey et al. | 219/121 EM |

OTHER PUBLICATIONS

Metals Handbook, vol. 6, 8th Ed., pp. 558-560, 1971.
"Better, Less Costly Bi-Metal Turbine Wheels EB Welded" Reprinted from Welding Engineer, Aug. 1962.
"Electron Beam Welding of Bimetal Turbine Wheels" Engineering Report United Aircraft Corp., 1962.

*Primary Examiner*—Elliot A. Goldberg
*Assistant Examiner*—G. R. Peterson
*Attorney, Agent, or Firm*—Craig & Antonelli

[57] ABSTRACT

A method for welding dissimilar metals, wherein the end of one of said dissimilar metals is welded to a metal plate by using a filler metal, the material of said metal plate being the same as that of another of said dissimilar metals; and electron beam welding is applied along the interface formed between such a joint surface of said metal plate, which does not include the aforesaid welded portion, and the joint surface of another of said dissimilar metals.

6 Claims, 3 Drawing Figures

WELDING METHOD FOR DISSIMILAR METALS

This invention relates to a welding method for dissimilar metals by using electron beam welding, and more particularly to electron beam welding which is applied for welding stationary blades of a turbine diaphragm to its inner and outer wheels of a material dissimilar to that of the aforesaid stationary blades.

The prior art welded construction of a turbine diaphragm, which is adapted to be positioned in opposing relation to a rotor blade within a casing of a steam turbine, is prepared according to the steps of: seal-welding a plurality of stationary blades disposed in radial direction to partition walls of a ring form, which walls are disposed in concentric relation to but along the inner and outer circumferences of the stationary blades thus disposed; and applying build-up welding according to the submerged arc welding to weld-grooves or spaces defined between the partition walls and the joint surfaces of the inner and outer wheels, which are to be jointed together, for providing weld metals filled in said grooves, whereby said stationary blades, inner wheel and outer wheel are welded together.

However, the prior art welded construction of a turbine diaphragm suffers from a shortcoming in that a great quantity of heat input imparted during build-up welding according to the submerged arc welding to provide massive joints causes deformation in welds of a turbine diaphragm.

For this reason, electron beam welding is now under consideration for replacing the aforesaid prior art build-up welding according to the submerged arc welding. In general, the material of stationary blades of a turbine diaphragm is dissimilar to that of inner and outer wheels thereof, and when electron beam welding is applied along the interface formed between the joint surfaces of the aforesaid dissimilar metals, the beads, i.e., weld metals are apt to be deflected from the aforesaid interface.

Thus, one of the welded constructions of a turbine diaphragm according to electron beam welding is such that the partition walls of the same material as that of the inner and outer wheels are so formed as to provide recessed portions whose bottoms have slots therein; the ends of the stationary blades are fitted in the aforesaid slots; then, build-up welding is applied to the interiors of the aforesaid recessed portions of the partition walls to provide build-up portions therein, the material of the build-up portions being the same as that of the inner and outer wheels; and an electron beam welding is applied along the interface formed between the aforesaid build-up portions/partition walls and inner wheel/outer wheel to provide rigid weld joints therebetween.

However, when the electron beam welding is applied to the build-up weld metal, then, oxygen content in the build-up weld metal will be increased, thus resulting in blow holes in welds depending on welding conditions.

It is an object of the present invention to provide a welding method for dissimilar metals without causing welding defects, and more particularly a welding method using an electron beam welding.

It is a further object of the present invention to provide a welding method for dissimilar metals by using electron beam welding, without causing blow holes in welds.

It is a yet further object of the present invention to provide a method for welding stationary blades of turbine diaphragm to the inner and outer wheels thereof, by using electron beam welding without causing blow holes in welds thus produced.

According to the present invention, there is provided a welding method for dissimilar metals, wherein the ends of one of the aforesaid dissimilar metals are fitted in slots provided in a metal plate, the materials of said metal plate being the same as that of the other of the dissimilar metals; then the fitted portions in the aforesaid metal plates are welded by using filler metals to thereby join said one of the dissimilar metals to the metal plates; and electron beam welding utilizing impulsive exothermic action of electrons is applied along the interfaces formed between the other of said dissimilar metals and such joint surfaces of said metal plates which do not include the welds formed on said fitted portions, thereby providing rigid weld joints therebetween.

Figure 1:
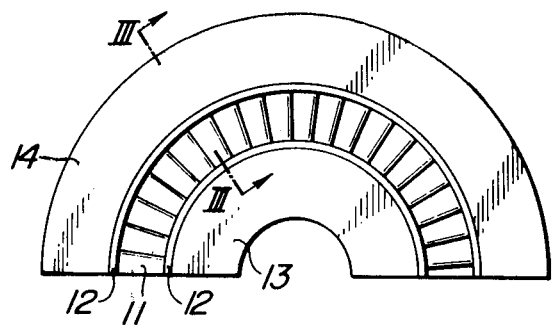
FIG. 1 is a front view of an outline of a turbine diaphragm adapted to be positioned in opposing relation to turbine blades.

As shown in a plan view in FIG. 1, the construction of a turbine diaphragm disposed in opposing relation to a rotor blade within the casing of a steam turbine is such that stationary blades 11 presenting flow paths for steam are welded rigidly through the medium of partition walls 12 to inner and outer wheels 13 and 14, respectively.

In addition, submerged arc welding has been used for a turbine diaphragm consisting of the aforesaid components. More particularly, stationary blades 11 are fitted in slots provided in the partition walls, which slots have the same cross sectional configuration as those of stationary blades, after which the fitted portions are welded manually, thereby joining the stationary blades 11 to the partition walls 12. Then, build-up welding according to submerged arc welding is applied to weld grooves or spaces defined between the inner wheel 13, outer wheel 14 and the partition walls 12, on the upper and lower portions of the inner and outer wheels, respectively, thereby joining stationary blades 11 to the inner wheel 13 and outer wheel 14, respectively.

However, according to the aforesaid welding method of a turbine diaphragm, 50 to 150 passes are required for obtaining such a build-up portion, such that there will result the use of a great amount of man power and consumption of welding wires or fillet metals, and furthermore, a considerable degree of deformation of a welded construction will result.

In addition, since the material of the stationary blades 11 is usually of 12 Cr stainless steel, the preheating temperature and pass-to-pass temperature should be maintained to no less than 250° C, thus requiring the use of an oven, in which materials to be welded are placed, resulting in difficulties in welding operations.

To avoid the aforesaid difficulties, there has been proposed the use of electron beam welding for welding a turbine diaphragm. The welded construction of the turbine diaphragm is disclosed in the Japanese patent application No. 6777/73 by the applicant which was filed with the Japanese Patent Office in 1973, under the title of "welding method for dissimilar metals." According to the patent application No. 6777/73, the invention disclosed therein is directed to avoiding the shortcoming, such as deflection of a bead and the resulting non-welded portion, when electron beam welding is applied, while the aforesaid shortcoming would be caused, unless the metals to be jointed are the same material. More particularly, the materials of the partition walls 12 and build-up welds formed on the aforesaid partition walls are of a low alloy heat resisting steel, the same as that of the inner wheel 13 and outer wheel 14. Furthermore, there are provided recessed portions for the partition walls 12; then there are provided slots in the bottom of the aforesaid recessed portions; the ends of stationary blades 11 of 13r stainless steel are inserted in the aforesaid slots from the back of the partition walls 12; and seal-welding is applied to the bottom of the recessed portion. Then, build-up welding is applied to the aforesaid recessed portions of the partition walls 12 by using filler metals whose material is the same as that of the inner and outer wheels 13 and 14, respectively, to join the partition walls 12 to the stationary blades. Then, the build-up portions thus prepared are machined to specified dimensions to provide joint surfaces, after which the inner wheel 13 and the outer wheel 14 are fitted between the build-up portions formed on the partition walls 12, followed by the application of electron beam welding along the interface formed between the build-up portions/partition walls 12 and the inner wheel/outer wheel. In this manner, the electron beam welding is carried out for a turbine diaphragm to join the stationary blades to the inner and outer wheels thereof. However, the aforesaid electron beam welding suffers a shortcoming in that, because the build-up portions are welded, together with the partition walls, to the inner and outer wheels 13 and 14, respectively, then oxygen content in the build-up weld metal will be increased depending on the welding conditions, thus causing blow holes in welds. The presence of the blow holes leads to cracking in welds and thus the blow holes should be avoided in welding.

In case electron beam welding is applied to build-up weld metals, oxygen content in weld metals formed according to the electron beam welding tend to be increased considerably, as compared with a plate such as a steel plate, presenting possibility of the development of welding defects (blow hole).

Table 1 shows one example of the results of tests for oxygen content in weld metals and in plates as base metals.

Table 1

| Material | Oxygen content in metals $O_2$ content (p.p.m.) |
| --- | --- |
| Low alloy heat resisting steel plate | 30 – 40 |
| Carbon steel plate | 60 |
| Mild steel weld metal | 260 – 270 |
| Low alloy Cr-Mo weld metal (1) | 370 – 390 |
| Low alloy Cr-Mo weld metal (2) | 500 – 530 |

Figure 2:
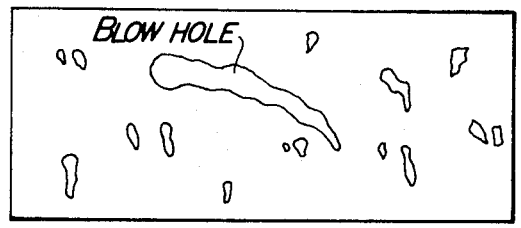
FIG. 2 is a X-ray picture of a weld formed according to an electron beam welding, for checking for blow holes.

In the tests, an electron beam welding was applied to the low alloy Cr-Mo weld metal having greater oxygen content, and it was found that as shown in a X-ray picture of FIG. 2, there was developed blow holes due to the influence of oxygen contained.

Since the presence of blow holes in weld metals causes for cracking therein, the blow holes in welds should be prevented to a maximum extent.

Figure 3:
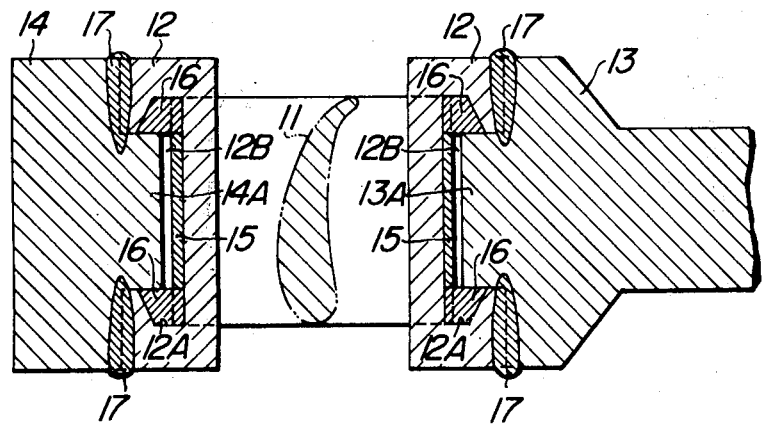
FIG. 3 is a partial cross sectional view showing the welded construction of a turbine diaphragm according to electron beam welding, said welded construction embodying the present invention and said cross sectional view being taken along the line III—III of FIG. 1.

FIG. 3 shows the cross sectional view of the welded construction of a turbine diaphragm embodying the present invention, taken along the line III—III of FIG. 1.

Referring to FIG. 3, the partition walls 12 are made of low alloy heat resisting steel or carbon steel of the same material as that of the inner wheel 13 and the outer wheel 14, and have recessed portions 12B in their central portions. There are provided slots at the bottoms of the recessed portions 12B of the partition walls 12, the foresaid slots having configurations accommodating the insertion of stationary blades 11 therein, while there are provided grooves 12A in the inner walls of recessed portions, presenting a larger space therein. In this respect the thickness of the partition walls 12 should be such as not to cause the so-called "burn-through," considering that the width of beams formed according to the electron beam welding ranges from 3 to 4 mm. Then, the ends of stationary blades 11 made of 13 Cr stainless steel are inserted from behind the partition walls 12 into the recessed portions 12B through the slots, after which the fitted portions of the stationary blades 11 are welding according to seal-welding to join the partition walls 12 to the stationary blades 11. Then, the build-up welding is applied to the grooves 12A of the recessed portions 12B in the partition walls 12 to provide build-up portions 16. In this respect, the amount of the build-up portion should be such as is sufficient from viewpoints of design strength required for joining the partition walls 12 to stationary blades 11. Thereafter, the inner surfaces of the recessed portions 12B of the partition walls 12 are machined in a manner that the projections 13A and 14A of the inner wheel 13 and outer wheel 14 may be fitted in the recessed portions 12B. Finally, electron beam welding is applied by utilizing the impulsive exothermic action of electrons along the interface formed between the partition walls and inner/outer wheels, which interface does not include the interfaces formed between the inner circumferential surfaces of the recessed portions 12B of the partition walls 12 and the projections 13A and 14A of the inner and outer wheels, 13 and 14, respectively.

In this case, the material of the partition walls 12 which is the same as that of the inner wheel 13 and outer wheel 14 of a turbine diaphragm should not necessarily be the same as that of the inner wheel and outer wheel, but may be such as not to cause the deflection of beads from the intended weld line, when electron beam welding is applied.

Included by the materials which are employable for the inner and outer wheels of a turbine diaphragm are 2 1/4 Cr- 1 Mo steel, 1Cr - 1/2 Mo steel, 1/2 Mo steel, and mild steel. As far as the partition walls to be joined to the inner and outer wheels contain 1/4 Cr, i.e., 0.25 % Cr and 1/5 Mo, i.e., 0.2 % Mo, the deflection of beads will not be caused according to the electron beam welding.

In short, the electron beam welding according to the present invention is applied along the interfaces 17 formed between the joint surfaces of the partition walls which do not include the weld metals 16 or build-up weld metals which are the cause for the blow holes and the joint surfaces of the inner wheel 13 and outer wheel 14 which do not include projections 13A and 14A, respectively.

Alternatively, in case ordinary dissimilar metals, such as for instance, chrominum steel and carbon steel are welded together according to the EBW, yet in case there is a limitation on the construction of carbon steel member, it is recommended that a small size carbon steel piece be welded to chrominum steel from the side of chrominum steel to provide fillet welds, after which the EBW is applied for a combination of carbon steel and small-size carbon steel piece, thus achieving welds between the chrominum steel and the carbon steel.

In this respect, in case the bending stress and tensile stress which exert on fillet welds formed between the small-size carbon steel and the chrominum steel are unfavorably great from viewpoints of the strength of the welded construction of members, there should be provided holes in the small-size carbon steel, in which holes are fitted ends of chrominum steel, after which build-up welding is applied in a manner to cover the fitted portions of chrominum steel. However, if the amount of the build-up portion is increased, then there will possibly occur thermal deformation due to heat input, such that the small-size carbon steel is formed to a recessed shape in an attempt that the build-up weld metals of an amount required is only allowed to enter the recessed portions of the carbon steel, while there is provided holes in the bottom of the aforesaid recessed portion for the chrominum steel. In addition, the application of the EBW to the joint surface of the build-up weld metals is apt to cause blow holes, such that there is provided grooves in the inner circumferential surfaces of the recessed portions formed in the small-size carbon steel, and build-up welding is then applied to the grooves, thus preventing build-up weld from entering the joint surfaces with the carbon steel. Then, electron beam welding is applied only along the interface between the joint surfaces of the small-size carbon steel and carbon steel.

According to the present invention, electron beam welding is applied along the interface formed between the joint surfaces of the dissimilar metals, without the deposited metal being interposed therebetween, such that the blow holes along the joint surfaces may be prevented.

Furthermore, the present invention may be applied to the construction of a turbine diaphragm, in which the stationary blades are welded to the joint surfaces of the inner and outer wheels of a material dissimilar to that of the stationary blades, without the deposited weld metals being interposed therebetween, such that blow holes along the joint surfaces may be prevented.

What is claimed is:
1. A method for joining two dissimilar metal members comprising steps of
   a. forming a joint surface on a first metal member,
   b. preparing a metal plate with a recessed portion, a slot through said metal plate to said recessed portion, and a joint surface for abutting said joint surface of the first metal member, said metal plate being substantially of the same material as that of the first metal member,
   c. fitting an end portion of a second metal member through said metal plate into said slot to extend into said recessed portion, said second metal member being of a material dissimilar from that of said first metal member and said metal plate,
   d. welding a filler metal into said recessed portion to rigidly join said end portion of said second metal member to said metal plate,
   e. abutting the joint surface of said first metal member to the joint surface of said metal plate, and
   f. applying electron beam welding only along the interface formed between the abutting joint surfaces of said first metal member and said metal plate, thereby joining the first and second metal members to each other through the metal plate.

2. A method for joining two dissimilar metal members as set forth in claim 1, wherein said metal plate is further formed with a groove along an inner side wall of said recessed portion, and further including, after said step (d) of welding said filler metal into said recessed portion, the step of applying built-up welding to said groove to further provide rigid connection between said end portion of the second metal member and said metal plate.

3. A method for joining two dissimilar metal members as set forth in claim 2, wherein the first metal member is further formed with a projection on said joint surface of said first metal member, said projection being fitted into said recessed portion of said metal plate.

4. A method for connecting stationary blades to outer and inner wheels of a turbine diaphragm, the material of said blades being dissimilar to that of said wheels, comprising the steps of;
   a. preparing a first partition wall adapted to be joined to an outer wheel of a turbine diaphragm, said first partition wall being substantially of the same material as that of said outer wheel,
   b. preparing a second partition wall adapted to be joined to an inner wheel of said turbine diaphragm, said second partition wall being substantially of the same material as that of said inner wheel,
   forming recessed portions having U-shaped cross-sections in said first and second partition walls and slots through said first and second partition walls to said recessed portions,
   d. fitting opposite ends of stationary blades into respective ones of said slots formed in said first and second partition walls to extend into said recessed portions, said stationary blades being of a material dissimilar from that of said inner and outer wheels,
   e. welding a filler metal into said recessed portions to rigidly join said stationary blades to said first and second partition walls,
   f. abutting said first partition wall to said outer wheel and said second partition wall to said inner wheel, and
   g. applying electron beam welding along the interfaces formed between said first partition wall and said outer wheel and along the interfaces formed between said second partition wall and said inner wheel, thereby joining the stationary blades to said outer and inner wheels through the first and second partition walls.

5. A method as set forth in claim 4, wherein each of said first and second partition walls is further formed with a groove on inner side surfaces of said recessed portions of said first and second partition walls, and further including, after said step (e), built-up welding by using different filler metals applied into said grooves in each respective recessed portion to further provide rigid connection between said blades and said first and second partition walls.

6. A method as set forth in claim 5, wherein projections are formed on the abutting surfaces of said inner and outer wheels, and said projections being fitted into said recessed portions.

* * * * *